Aug. 10, 1954 P. CSICSILA 2,685,714
CANOPY
Filed April 27, 1953 2 Sheets-Sheet 1

INVENTOR.
PETER CSICSILA
BY
Adolph G. Martin
ATTORNEY

Aug. 10, 1954  P. CSICSILA  2,685,714
CANOPY
Filed April 27, 1953  2 Sheets-Sheet 2

INVENTOR.
PETER CSICSILA
BY
Adolph G. Martin
ATTORNEY

Patented Aug. 10, 1954

2,685,714

UNITED STATES PATENT OFFICE 2,685,714

CANOPY

Peter Csicsila, Dearborn, Mich.

Application April 27, 1953, Serial No. 351,145

5 Claims. (Cl. 20—19)

The invention hereinafter described relates to canopies generally, and more particularly to a canopy of the type adapted for use with an elevating door.

It has long been a problem to protect adequately loading docks of freight depots and warehouses during inclement weather. In some instances the loading and unloading area of the dock is protected during these operations by the completely unsatisfactory expedient of placing a tarpauling between the truck and warehouse. This means affords a certain amount of protection to the freight being moved on the platform, but provides inadequate protection for the metal skids over which the freight handling carts are shuttled.

As a consequence, the metal skids frequently become wet with snow and rain and fail to provide a sufficient amount of traction for either men or vehicles. Accordingly, many injuries to personnel and much damage to freight results from the use of such wet slipper skids. Since such injuries and damage are extremely costly, it is the applicant's primary object to eliminate the hazards of slippery skids by providing a convenient and effective means of protecting the vital areas of depot and warehouse platforms.

Another object of the applicant's invention is to provide a canopy for use with an elevating door, adapted to extend automatically as the door is elevated, so as to protect platform area over which freight is to be moved during a loading or unloading operation.

A further object of the invention is to provide a canopy of the type previously described, which is adapted to extend into a van or truck when the loading doors of such vehicles are open and they are parked at the platform.

Still another object of the invention is to provide a canopy of the type described, which is adapted to retract automatically from its position over the platform as the warehouse door is lowered at the conclusion of a loading or unloading operation.

Yet another object of the invention is the provision of a canopy of the type previously described, which is relatively inexpensive to produce and extremely convenient to use.

Additional advantages of the invention will become increasingly apparent after thorough consideration of a detailed discussion composed with reference to the accompanying drawings, constituting a portion of this application, and in which.

Figure 1:
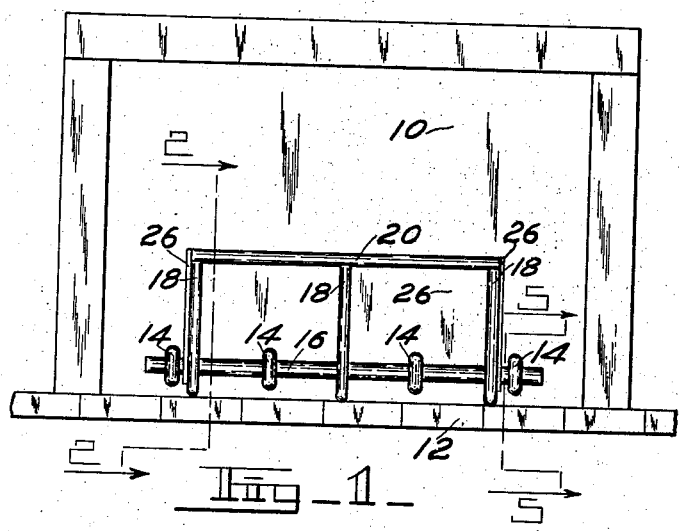
Figure 1 is an elevation view of an elevating door showing the canopy comprising the applicant's invention attached to the bottom of the door and rotated to a retracted position.

For a detailed discussion of the invention, reference is made to Figure 1 of the drawings in which numeral 10 designates an elevating door mounted in a warehouse wall not here fully shown, and resting on a loading platform 12. A series of spaced eye bolts 14, are secured in the elevating door 10 adjacent the lower edge. An elongated tubular member 16 is supported for rotation in the eye bolts 14.

A plurality of ribs 18, each having a curved end portion, are welded or otherwise secured at spaced intervals, to the tubular member 16. A curved tie rod 20 is secured to the outer ends of the ribs 18, so as to elevate the central rib slightly. A support brace 22 is connected across the curved portion of each rib member 18, so as to provide a more rigid canopy framework. A series of spaced buttons 24, for attaching an impervious cover 26, is provided on the curved ribs 18 and the other members of the canopy framework.

This completes a description of the structural details of the invention; however, to comprehend more completely the applicant's invention, a discussion will now be directed to the manner in which the device operates so as to perform its intended function, and accomplish the objectives set forth in the introduction of this specification.

Figure 3:
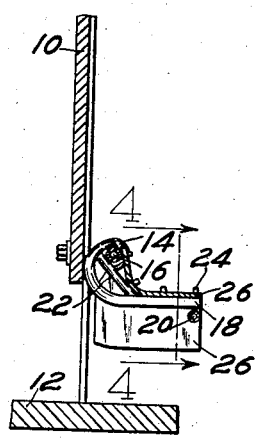
Figure 3 is a section view similar to Figure 2 with the door elevated and the canopy rotated to an extended position over the platform.
Figure 4:
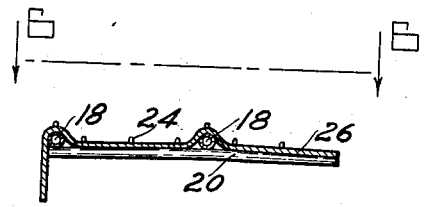
Figure 4 is a section view taken substantially on plane 4—4 in Figure 3, showing the slightly elevated position of the center rib in the canopy framework.
Figure 5:
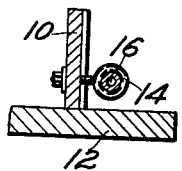
Figure 5 is a section view taken substantially on plane 5—5 in Figure 1, showing the eye bolts attaching the canopy to the door.
Figure 6:
Figure 6 is a plan view taken substantially on plane 6—6 in Figure 4, showing the manner in which the cover is attached to the canopy framework.

In use, when the door 10 is elevated, the canopy will rotate automatically to a fully extended position, as shown in Figure 3, so that it will extend inside any truck properly positioned at the loading platform 12. At the conclusion of the loading or unloading operation, as the door 10 is lowered, the ribs 18 make contact with the loading platform 12. This contact exerts an upward force on the canopy causing it to rotate in a counter-clockwise direction toward the door 10.

Figure 2:
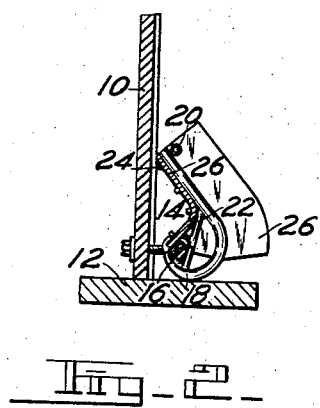
Figure 2 is a section view of a canopy and door taken substantially on plane 2—2 in Figure 1 showing the characteristic shape of the rib members.

As the more highly curved portion of the ribs 18 are brought into contact with the platform 12, the rotation of the canopy is accelerated so that it will reach the position shown in Figure 2 when the door 10 is fully lowered. As a natural consequence of this method of operation, the canopy is locked in position against the door 10 and cannot be accidentally lowered with the door in a closed position.

In practice, it will be necessary to dimension the outlet end of the canopy, so that it may conveniently extend within all the standard rear openings provided on trucks and vans in use at the present time. Furthermore, it may prove desirable to place detachable side curtains on the applicant's canopy to provide additional protection for the platform. However, such details are mere refinements of the applicant's basic structure, and their use will be dictated by the circumstances peculiar to each installation.

The applicant is of the pinion that his invention has fullfilled a long felt need in the field of truck transportation, and that he has made an extremely valuable contribution to the related art. However, while the invention was described with reference to the structural details of a particular embodiment, it will be appreciated by those skilled in the art, that the principles involved therein are susceptible of numerous other applications.

Therefore, I claim as new, and wish to secure by Letters Patent:

1. A canopy for an elevating door having a platform thereunder, such canopy comprising a covered frame with an upwardly curved end portion and means pivotally connecting the curved portion of the frame to the door, such pivotal means being adapted to permit the curved portion of the frame to make a sliding contact with the platform as the door is being lowered thereby rotating the covered frame upward to a retracted position, such pivotal means being also adapted to permit the covered frame to rotate downward to an extended position over the platform as the door is being raised, in which extended position the curved portion of the covered frame makes contact with the door thereby preventing further downward rotation of the frame.

2. A canopy for an elevating door having a platform thereunder, such canopy comprising a covered frame having a plurality of ribs each having a curved end portion and a transverse member connecting the ribs together adjacent the curved ends, and means pivotally connecting the transverse member of the frame to the elevating door, such pivotal means being adapted to permit the curved portion of the ribs to make a sliding contact with the platform as the door is being lowered, thereby rotating the covered frame upward to a retracted position, such means being also adapted to permit the covered frame to rotate downward to an extended position over the platform as the door is being raised, in which extended position the curved portion of the ribs makes contact with the door thereby preventing further downward rotation of the frame.

3. A canopy for an elevating door having a platform thereunder, such canopy comprising a covered frame having a plurality of ribs each with a curved end portion, a transverse member connecting the ribs together adjacent the curved ends and a brace connected across the curved portion of each rib and means pivotally connecting the transverse member of the covered frame to the elevating door, such pivotal means being adapted to permit the curved portion of the ribs to make a sliding contact with the platform as the door is being lowered, thereby rotating the covered frame upward to a retracted position, such pivotal means being also adapted to permit the covered frame to rotate downward to an extended position over the platform as the door is being raised, in which extended position the curved portion of the ribs makes contact with the door thereby preventing further downward rotation of the frame.

4. A canopy for an elevating door having a platform thereunder, such canopy comprising a frame having a series of spaced ribs each with a curved end portion, a first transverse member connecting the ribs together adjacent the curved portion, a second transverse member connecting the ribs together beyond the curved portion and a brace connected across the curved portion of each rib, a cover on the framework and means pivotally connecting the first transverse member of the frame to the elevating door, such pivotal means being adapted to permit the curved portion of the ribs to make a sliding contact with the platform as the door is being lowered, thereby rotating the covered frame upward to retracted position, such pivotal means being also adapted to permit the covered frame to rotate downward to an extended position over the platform as the door is being raised, in which extended position the curved portion of the ribs makes contact with the door thereby preventing further downward rotation of the frame.

5. A canopy for an elevating door having a platform thereunder, such canopy comprising a frame having a series of spaced ribs each with a curved end portion, a transverse member connecting the ribs together adjacent the curved portion and a brace connected across the curved portion of each rib, a removable cover on the frame and spaced eyes on the transverse member mounted on the elevating door so as to provide for limited rotation of the frame, such rotation enabling the curved portion of the ribs to make sliding contact with the platform as the door is being lowered, thereby rotating the frame upward to a retracted position, and also enabling the frame to rotate downward to an extended position over the platform as the door is being raised, in which extended position the curved portion of the ribs makes contact with the door thereby preventing further downward rotation of the frame.

References Cited in the file of this patent

UNITED STATES PATENTS

| Number | Name | Date |
|---|---|---|
| 663,989 | Wilson | Dec. 18, 1900 |
| 1,178,554 | Thomson | Apr. 11, 1916 |
| 1,465,265 | Hamme | Aug. 21, 1923 |